(12) United States Patent
Tametani et al.

(10) Patent No.: US 9,951,805 B2
(45) Date of Patent: Apr. 24, 2018

(54) INTEGRATED CABLE DESIGN FOR INSIDE RELEASE AND INSIDE LOCK FUNCTION

(75) Inventors: Yoshihiko Tametani, Kanagawa (JP); Vinayak Giriyalkar, Karnataka (IN); Arun Manjunath, Karnataka (IN); Randhir Pillai, Karnataka (IN)

(73) Assignee: INTEVA PRODUCTS, LLC, Troy, MI (US)

( * ) Notice: Subject to any disclaimer, the term of this patent is extended or adjusted under 35 U.S.C. 154(b) by 435 days.

(21) Appl. No.: 13/602,882

(22) Filed: Sep. 4, 2012

(65) Prior Publication Data

US 2013/0228036 A1 Sep. 5, 2013

(30) Foreign Application Priority Data

Mar. 1, 2012 (IN) .............................. 583/DEL/2012

(51) Int. Cl.
*F16C 1/10* (2006.01)
(52) U.S. Cl.
CPC .............. *F16C 1/106* (2013.01); *F16C 1/105* (2013.01); *Y10T 29/49826* (2015.01); *Y10T 74/20462* (2015.01)
(58) Field of Classification Search
CPC .... F16C 1/102–1/106; F16C 1/14–1/18; F16L 3/221; F16L 3/22; Y10T 74/2045; Y10T 74/20462
See application file for complete search history.

(56) References Cited

U.S. PATENT DOCUMENTS

| | | | | |
|---|---|---|---|---|
| 4,691,883 A * | 9/1987 | Kurihara | ...................... | 248/74.2 |
| 4,763,541 A * | 8/1988 | Spease | .......................... | 74/500.5 |
| 4,951,524 A * | 8/1990 | Niskanen | ................ | F16C 1/105 |
| | | | | 248/74.2 |
| 5,113,717 A * | 5/1992 | Plamper | ........................ | 74/502.6 |
| 5,172,878 A * | 12/1992 | Lederman | ..................... | 74/502.4 |
| 5,233,881 A * | 8/1993 | Sayen et al. | .................. | 74/502.4 |
| 5,236,212 A * | 8/1993 | Duehring et al. | ............ | 74/502.4 |
| 5,272,934 A * | 12/1993 | Chegash | .................. | F16C 1/105 |
| | | | | 24/136 L |
| 5,613,406 A * | 3/1997 | Rutkowski | .............. | F16C 1/105 |
| | | | | 248/27.3 |
| 5,615,584 A * | 4/1997 | Irish | .............................. | 74/502.6 |
| 8,176,810 B2 * | 5/2012 | Lundgren | .................... | 74/502.6 |
| 2005/0115730 A1 * | 6/2005 | Odahara et al. | ............ | 174/50.54 |
| 2011/0290949 A1 * | 12/2011 | Trouve et al. | ................... | 248/65 |

* cited by examiner

*Primary Examiner* — Daniel D Yabut
(74) *Attorney, Agent, or Firm* — Cantor Colburn LLP

(57) ABSTRACT

A cable end fitting for use in a latch is provided including a sheath for surrounding a portion of a first cable and a second cable. A portion of the sheath, including a first end is positioned within a housing. A base plate is coupled to the second end of the sheath. A first bore and a second bore extend through the base plate and the sheath. The base plate retains the cable end fitting in a position in the latch.

16 Claims, 6 Drawing Sheets

INTEGRATED CABLE DESIGN FOR INSIDE RELEASE AND INSIDE LOCK FUNCTION

CROSS REFERENCE TO RELATED APPLICATIONS

This application claims the benefit of the following Indian Patent Application Ser. No. 583/DEL/2012, filed on Mar. 1, 2012, the contents of which is incorporated herein by reference thereto.

BACKGROUND

Exemplary embodiments of the present invention relate generally to latch mechanisms and, more particularly, to end fittings for cables in latch mechanisms.

Conventional latch mechanisms may include multiple cables, each coupled to a lever for carrying out various functions, such as locking and releasing the latch for example. Often, these cables have to be connected to the interior of the latch, accessible by only a small opening through which the cable is inserted. In addition, other components of the latch, such as the door trim fixing plug, may interfere with the positioning of the cable as it is inserted into the latch. This can make the assembly process difficult, time consuming, costly and prone to error. It is also difficult to disassemble the cable connection for maintenance without damaging the cable, the cable fitting or the latch.

Accordingly, it is desirable to provide a latch mechanism wherein multiple cables can be installed together, thereby reducing the number of parts of the latch and simplifying the cable installation process.

SUMMARY OF THE INVENTION

According to an exemplary embodiment of the present invention, a cable end fitting for use in a latch is provided including a sheath for surrounding a portion of a first cable and a second cable. A portion of the sheath, including a first end, is positioned within a housing. A base plate is coupled to the second end of the sheath. A first bore and a second bore pass through the base plate and the sheath. The base plate retains the cable end fitting in a position in the latch.

According to another embodiment of the present invention, a cable assembly within a latch is provided including a back plate having a cable abutment. The cable abutment includes an arm and a hook that extend substantially perpendicular to the cable abutment. The arm and hook form a slot. The cable assembly additionally includes a cable end fitting for retaining a first cable and a second cable about a latch end. A portion of the cable end fitting is disposed and retained within the slot.

According to yet another embodiment, a method is provided for installing cables within a latch including, inserting a first cable into a first bore of a cable end fitting. A second cable is then inserted into a second bore of the cable end fitting. The cable end fitting is then connected to a back plate of the latch.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

DETAILED DESCRIPTION

Figure 1A:
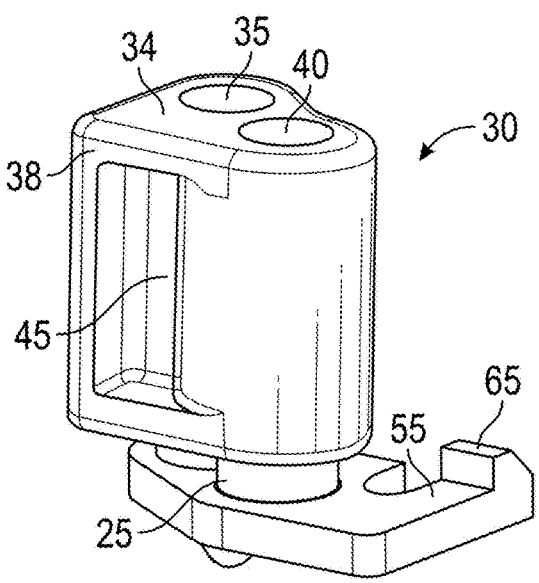
FIGS. 1A-1D are various perspective views of an exemplary embodiment of the present invention.
Figure 1B:
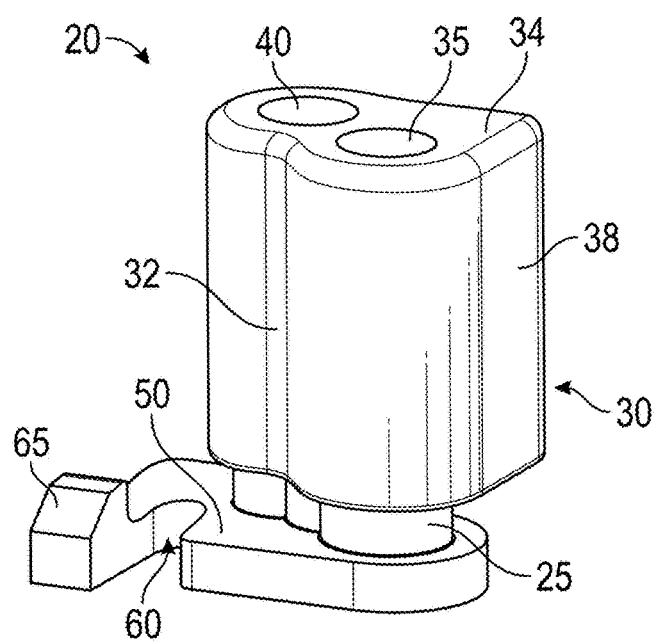
Figure 1C:
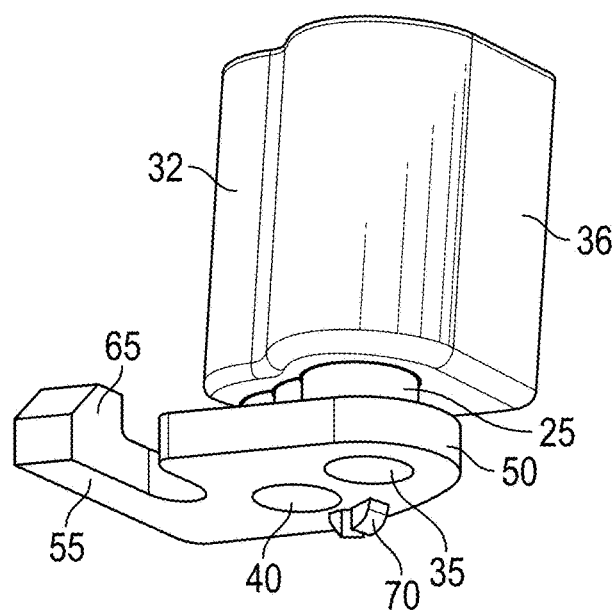
Figure 1D:
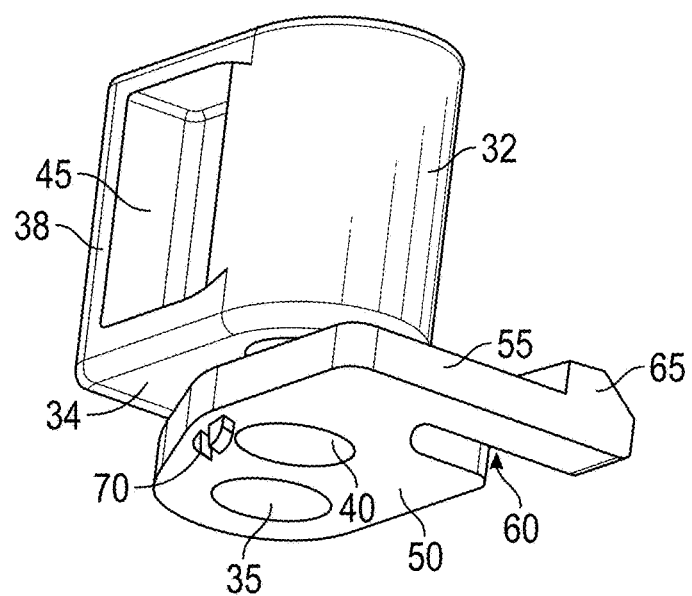

Referring now to FIGS. 1A-1D, a cable end fitting 20 for retaining more than one cable in a latch is illustrated. The cable end fitting 20 includes a sheath 25 for surrounding a first cable and second cable. A portion of the sheath 25, including one end, is encompassed within a housing 30. The opposite end of the sheath 25 is coupled to a base plate 50. A first bore 35 and a second bore 40, each having a substantially uniform cross-section along its length, extend from the base plate 50, through the sheath 25. In one embodiment the first bore 35 and the second bore 40 are equal in diameter. In another embodiment, the first bore 35 and the second bore 40 have different diameters.

The housing 30 surrounds the entire circumference of the outer surface of the sheath 25. In one embodiment, at least a portion of the outside surface of the housing 30 has a contoured surface 32 complementary to the shape of the exterior of the sheath 25. A portion 34 of the housing 30, opposite the contoured outside surface 32, may extend between perpendicular surfaces 36 and 38 to form a substantially right angle. One of the surfaces 38 forming the right angle 34 of housing 30 includes an inlet or groove 45 to provide a relief to reduce the risk of the housing 30 interfering with adjacent components of the latch. The base plate 50 includes an arm 55 separated from the portion of the base plate 50 having the first bore 35 and the second bore 40 by a gap 60. The distal end of the arm 55 includes a protrusion 65 extending substantially perpendicular from the base plate 50 in the direction of the sheath 25 and the housing 30. In one embodiment, the base plate 50 is made of a resilient material such that the arm 55 is able to bend or deform out of the plane of the base plate 50. The base plate 50 additionally includes a small clip 70 positioned adjacent the second bore 40.

Figure 2:
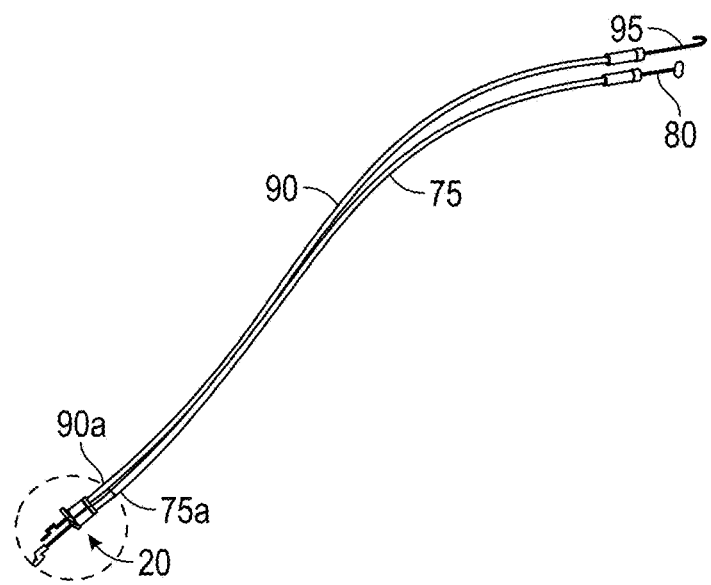
FIG. 2 is a perspective view of a set release cable and a sill cable according to the present invention.
Figure 3:
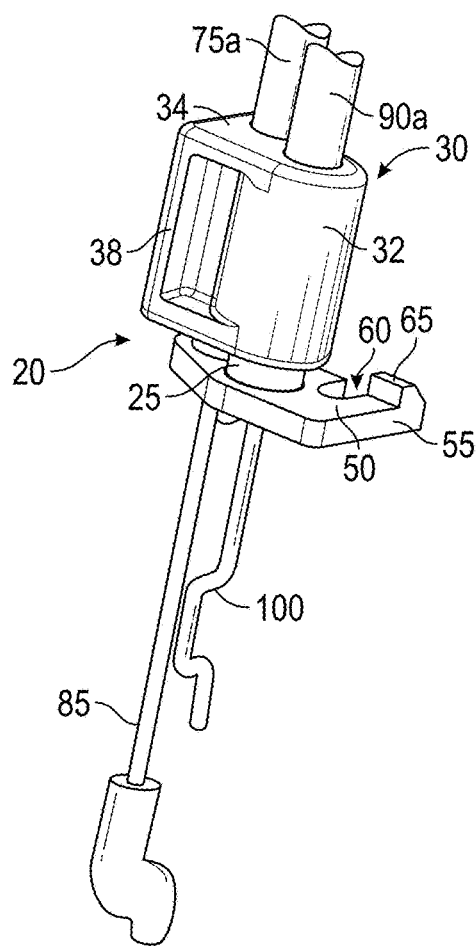
FIG. 3 is a detailed view of the cable end fitting assembly as illustrated in FIG. 2.

Referring now to FIGS. 2 and 3, a first cable 75 and a second cable 90 are attached to the cable end fitting 20 before the cable end fitting 20 is connected to the latch. In one embodiment, the first cable 75 is a release cable and the second cable 90 is a sill cable. The first cable 75 is inserted into the housing 30 and through the first bore 35 of the sheath 25. When in position, a first connector 85, attached at a latch end 75a of the first cable 75, extends beyond the base plate 50 of the cable end fitting 20. Similarly, the second cable 90 is inserted through the second bore 40 of the sheath 25 such that the second connector 100, attached at a latch end 90a of the second cable 90, is disposed adjacent the base plate 50. The clip 70 (FIG. 1) on the bottom of the base plate 50 maintains the position and direction of the second cable 90, thereby making it easier to assemble the second cable 90 into the cable end fitting 20.

Figure 4:
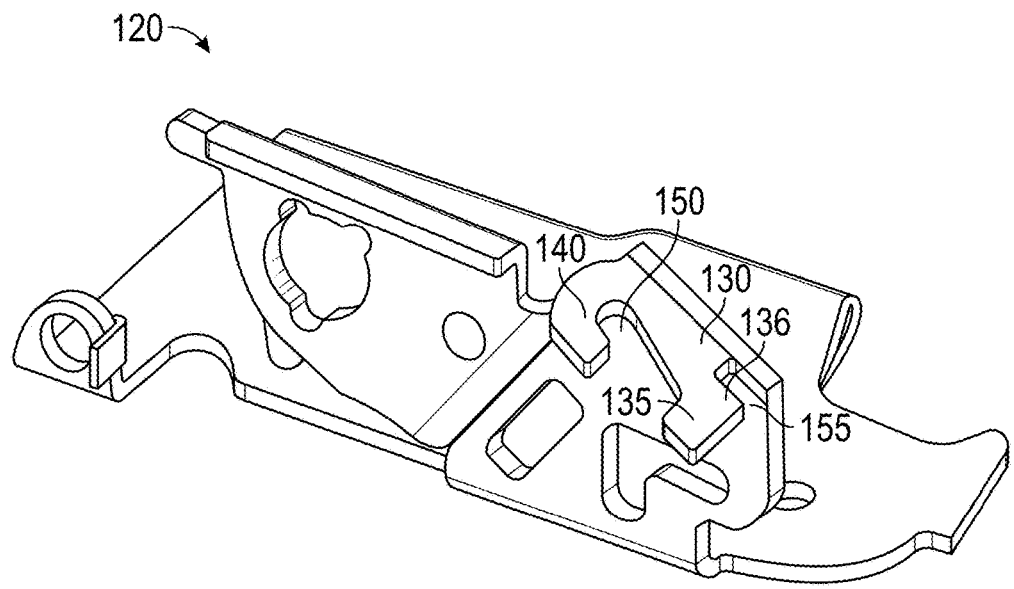
FIG. 4 is a perspective view of a base plate of a latch according to an embodiment of the present invention.

FIG. 4 illustrates an exemplary back plate 120 of a latch mechanism in accordance with an embodiment of the present invention. The back plate 120 includes a cable abutment 130 having an arm 135 and a hook 140 that extend substantially perpendicular from the cable abutment 130. Together, the arm 135 and the hook 140 form a slot 150 into which a portion of the cable end fitting 20 may be located. The slot 150 (also see FIGS. 6 and 7) has a contour complementary to the outside surface of the sheath 25. In addition, arm 135 extends away from the cable abutment 130, thereby creating a gap 155 between an elbow 136 of the arm 135 and the cable abutment 130. A portion of the cable end fitting 20 extends into the gap 155 to prevent movement of the cable end fitting 20 relative to the back plate 120.

Figure 5:
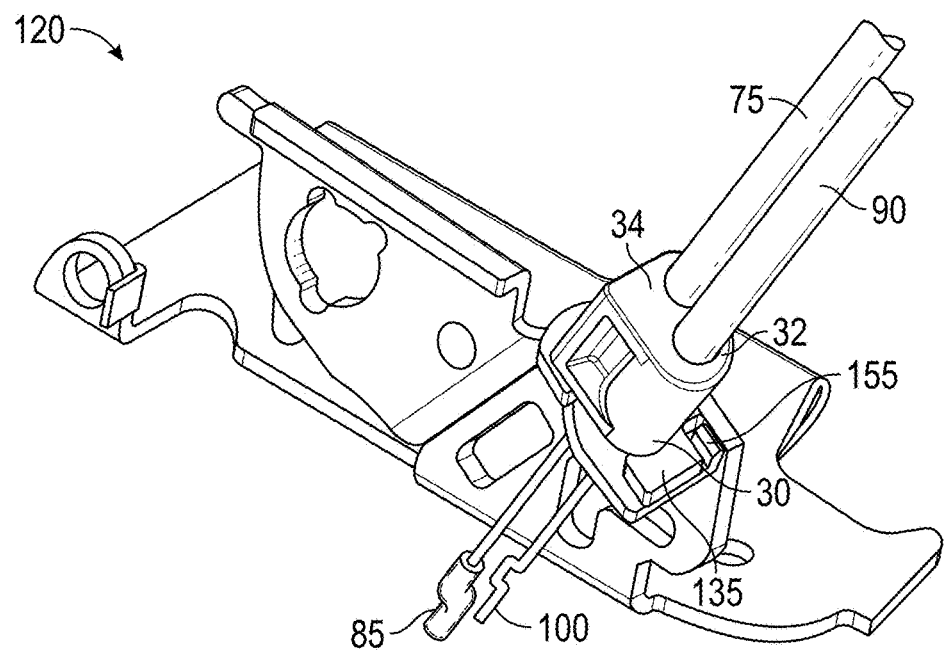
FIG. 5 is a perspective view of the assembled base plate and cable fitting according to the present invention.
Figure 6:
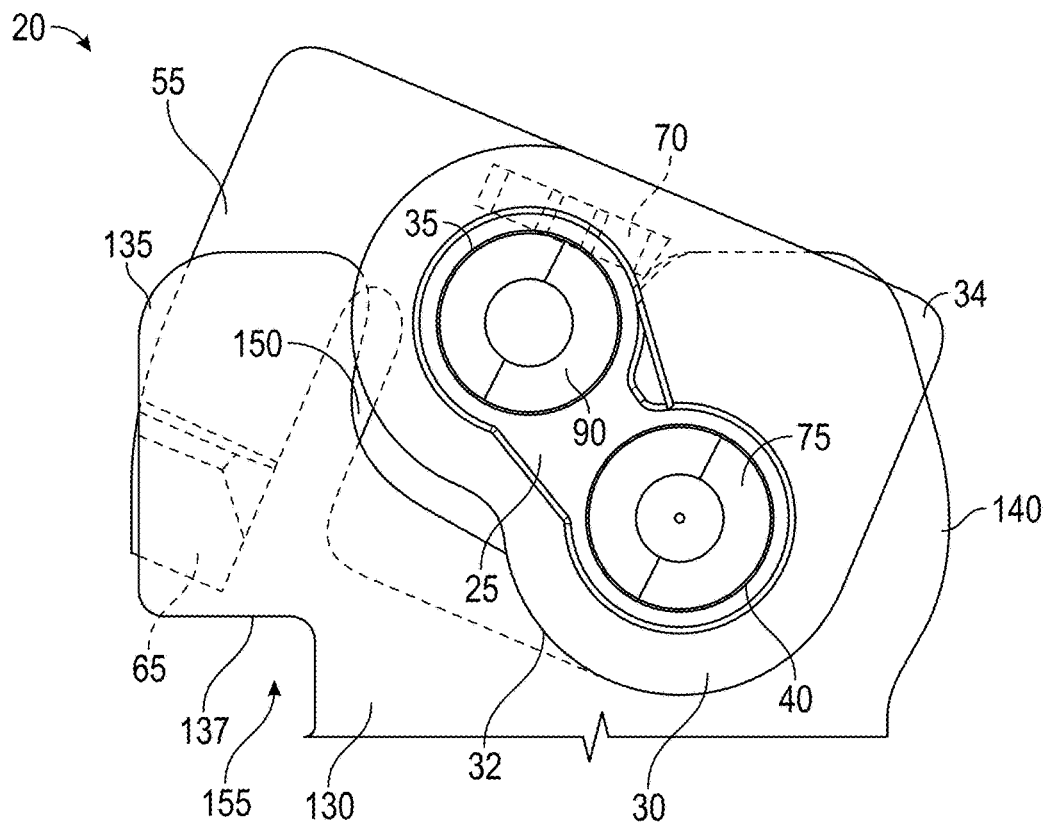
FIG. 6 is a front view of the base plate and cable fitting during assembly.
Figure 7:
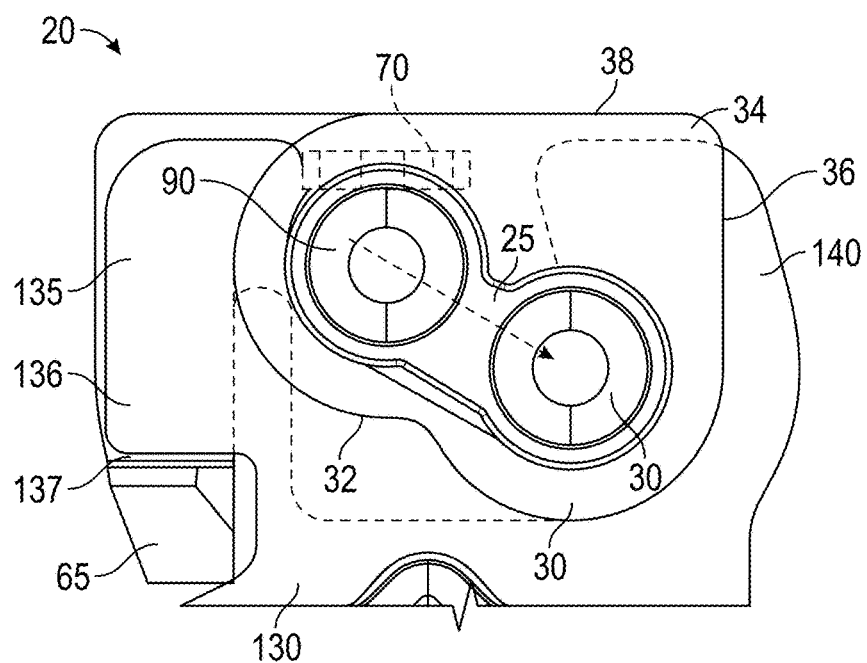
FIG. 7 is a front view of the assembled base plate and cable fitting according to the present invention.

Referring now to FIGS. 5-7, the assembly of the base plate 120 and the cable end fitting 20 is illustrated. Once the first cable 75 and the second cable 90 are connected to the cable end fitting 20, the cable end fitting 20 may then attached to the back plate 120. After positioning the cable end fitting 20 within slot 150, the first connector 85 at the latch end of the first cable 75 and the second connector 100 at the latch end of the second cable 90 may be coupled to other portions of the latch mechanism. To couple the cable end fitting 20 to the base plate 120, the exposed portion of the sheath 25, not covered by housing 30, is slid into position within the slot 150 of the cable abutment 130. The first cable 75 is located adjacent hook 140 and the second cable 90 is adjacent arm 135. The hook 140 and arm 135 extend about the sheath 25 such that the housing 30 is disposed on one side of the hook 140 and arm 135, and the base plate 50 is disposed on the other. In one embodiment, the exposed portion of the sheath 25 between the housing 30 and the base plate 50 has a length at least equal to the width of the arm 135 and the hook 140 of the cable abutment 130. The arm 55 of the base plate 50 is located adjacent the arm 135 of the cable abutment 130 such that the protrusion 65 is located within gap 155. Because the protrusion 65 extend substantially perpendicular to the plane of the base plate 50, an edge of the protrusion 65 engages a surface 137 of the arm 135, thereby retaining the cable end fitting 20 in position relative to the base plate 120.

Figure 8:
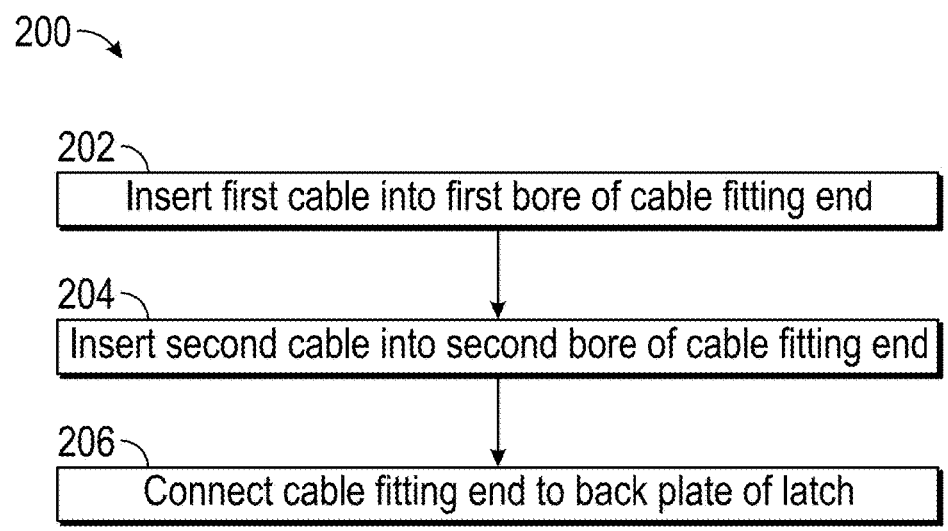
FIG. 8 is a flow diagram illustrating an exemplary method for installing cables within a latch.

The method 200 of installing cables within a latch is illustrated in FIG. 8. In block 202, a cable, such as first cable 75 for example, is connected to the cable end fitting 20 through the first bore 35. Another cable, such as second cable 90 for example, is then connected to the cable end fitting 20, as shown in block 204, through the second bore 40. In block 206, the cable end fitting 20, having a first connected cable and a second connected cable is then coupled to a back plate 120 of a latch. To couple the cable end fitting 20 to the back plate 120, the exposed portion of the sheath 25 is inserted into a slot 150 of a cable abutment 130. As the cable end fitting 20 is rotated into position in the slot 150, the arm 55 of the base plate 50 is located adjacent the arm 135 of the cable abutment 130. When the sheath 25 is in its final position within the slot 150, the arm 135 and hook 140 of the cable abutment 130 limit the movement of the cable end fitting 20 out of the plane of the cable abutment 130 by contacting either the base plate 50 or the housing 30. Additionally, the protrusion 65 of the distal end of the arm 55 of the base plate 50 engages a surface of the arm 135 of the cable abutment 130 adjacent the elbow, thereby preventing rotation of the cable end fitting 20 relative to the cable abutment 130.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cable end fitting for securing cables to a latch, the cable end fitting comprising:
   a housing surrounding a portion of a first cable and a second cable;
   a base plate with an integral arm having a protrusion, a sheath having one end that is partially encompassed within the housing and an opposite end that is directly coupled to the base plate, wherein the housing has a first bore and a second bore extending therethrough such that the first cable and second cable can extend through the housing and wherein the housing, the base plate, the sheath, the integral arm and the protrusion are releasably secured to a back plate of the latch via rotational movement of the housing with respect to the back plate, wherein the integral arm is only located on one side of the back plate and the housing is only located on another opposite side of the back plate when the cable end fitting is secured to the back plate, and the integral arm and the protrusion prevents unwanted rotational movement of the cable end fitting with respect to the back plate when the cable end fitting is secured to the back plate.

2. The cable end fitting according to claim 1, wherein the integral arm has a portion that is separated from the base plate by a gap.

3. The cable end fitting according to claim 1, wherein a portion of an outside surface of the housing has a contoured surface.

4. The cable end fitting according to claim 3, wherein a portion of the outside surface of the housing, opposite the contoured surface, extends from two substantially perpendicular surfaces to form a substantially right angle.

5. The cable end fitting according to claim 4, wherein one of the surfaces forming the right angle of the housing includes a groove.

6. The cable end fitting according to claim 1, wherein the first cable is a release cable.

7. The cable end fitting according to claim 1, wherein the second cable is a sill cable.

8. A cable assembly for a latch comprising:
   a back plate having a cable abutment, wherein the cable abutment includes an arm and a hook that form a slot; and
   a cable end fitting removably secured to the back plate, the cable end fitting having a housing surrounding a portion of a first cable and a second cable, the cable end fitting having a base plate with an integral arm having a protrusion, a sheath having one end that is partially encompassed within the housing and an opposite end that is directly coupled to the base plate, wherein the housing has a first bore and a second bore extending therethrough such that the first cable and second cable can extend through the housing and wherein the housing, the base plate, the sheath, the integral arm and the protrusion are releasably secured to the cable abutment via rotational movement of the cable end fitting with respect to the slot, wherein the base plate and integral arm are located on only one side of the cable abutment and the housing is only located on another opposite side of the cable abutment when the cable end fitting is secured to the cable abutment, and wherein the integral arm and the protrusion prevents unwanted rotational movement of the cable end fitting with respect to the cable abutment when the cable end fitting is secured to the cable abutment.

9. The cable assembly according to claim 8, wherein a width of the portion of the cable end fitting located between the base plate and the housing is at least equal to a width of the arm and hook of the cable abutment.

10. The cable assembly according to claim 8, wherein the protrusion extends substantially perpendicular from a plane of the base plate in a direction towards the housing.

11. The cable assembly according to claim 10, wherein the arm of the cable abutment defines a gap configured to receive the protrusion therein when the cable end fitting is secured to the cable abutment.

12. The cable assembly according to claim 11, wherein engagement of the protrusion in the gap prevents movement of the cable end fitting once it is secured to the cable abutment.

13. The cable assembly according to claim 8, wherein the first cable is a release cable.

14. The cable assembly according to claim 8, wherein the second cable is a sill cable.

15. The cable assembly according to claim 8, wherein the base plate further comprises a clip for maintaining a position and direction of either the first cable or the second cable.

16. The cable end fitting according to claim 1, wherein the base plate further comprises a clip for maintaining a position and direction of either the first cable or the second cable.

\* \* \* \* \*